United States Patent [19]

Krampe et al.

[11] 3,908,132

[45] Sept. 23, 1975

[54] ARRANGEMENT FOR SYNCHRONIZING STATIC THYRISTOR CONVERTERS FOR SUPPLYING THREE PHASE MOTORS

[75] Inventors: Dietrich Krampe, Erlangen; Wilhelm Linden, Erlangen-Buchenbach, both of Germany

[73] Assignee: Siemens Aktiengesellschaft, Munich, Germany

[22] Filed: Jan. 24, 1974

[21] Appl. No.: 436,071

[30] Foreign Application Priority Data
Jan. 29, 1973 Germany............................ 2304229

[52] U.S. Cl................................. 307/87; 321/27 R
[51] Int. Cl.² ........................................... H02J 3/00
[58] Field of Search............... 307/87, 82; 321/27 R; 318/227, 231

[56] References Cited
UNITED STATES PATENTS

| | | | |
|---|---|---|---|
| 2,521,126 | 9/1950 | Price | 100/1 |
| 2,599,290 | 6/1952 | Schwenzer | 100/34 |
| 2,815,862 | 12/1957 | Einhorn | 211/177 X |
| 2,818,180 | 12/1957 | Keene | 100/1 |
| 2,850,197 | 9/1958 | Hart | 100/34 X |
| 2,965,016 | 12/1960 | Price | 100/1 |
| 3,459,120 | 8/1969 | Brunette | 100/34 |
| 3,591,012 | 7/1971 | Grady | 211/50 |
| 3,639,820 | 2/1972 | Stemmler | 307/87 |
| 3,739,714 | 6/1973 | Howard | 100/34 |
| 3,753,002 | 8/1973 | Jacobson | 307/87 |
| 3,769,571 | 10/1973 | Wilkinson | 321/27 R |

*Primary Examiner*—Robert K. Schaffer
*Assistant Examiner*—M. Ginsburg
*Attorney, Agent, or Firm*—Kenyon & Kenyon Reilly Carr & Chapin

[57] ABSTRACT

An arrangement for synchronizing two static converters supplying three phase motors so that one converter may be taken off the line and the other put on the line without disturbance in which the firing pulses for the thyristors in the converters and generated in the converter control unit are used to make phase and frequency comparisons in order to initiate switching.

7 Claims, 2 Drawing Figures

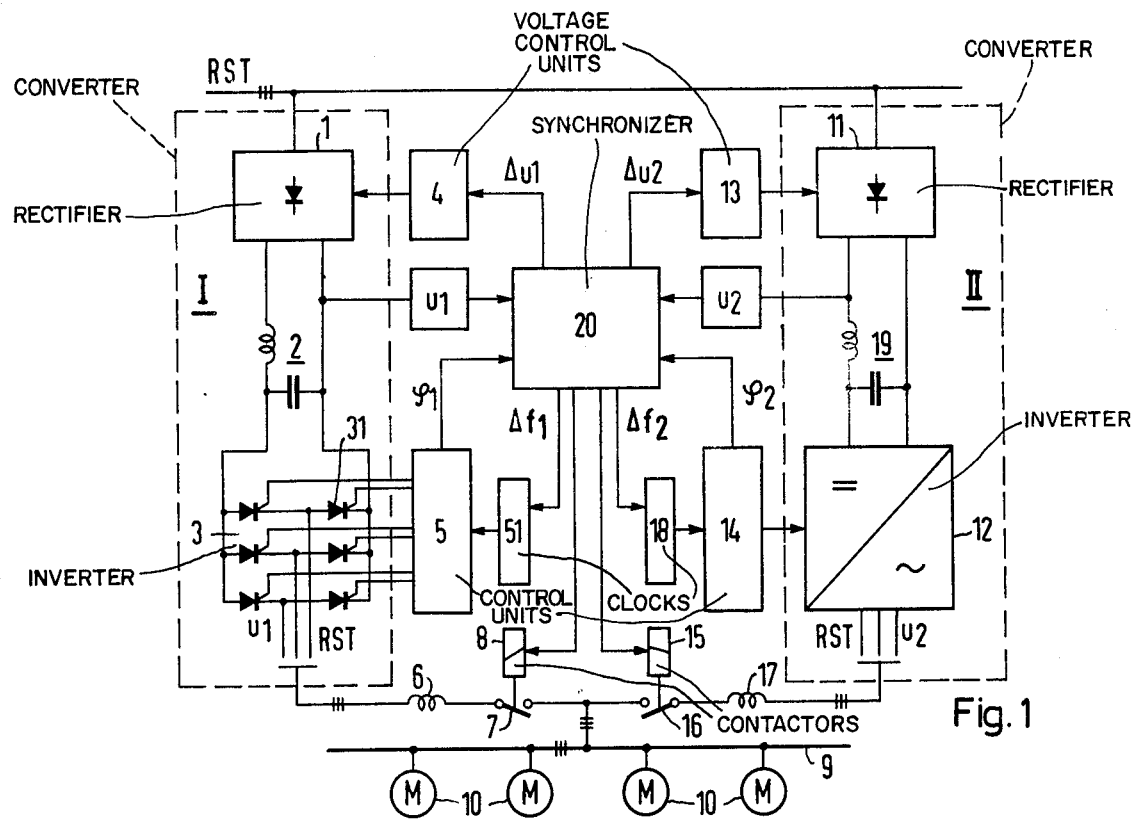
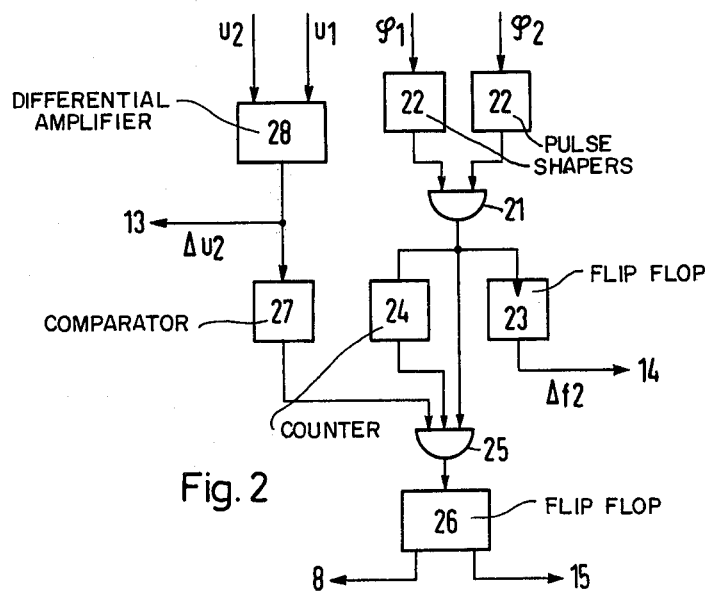

ARRANGEMENT FOR SYNCHRONIZING STATIC THYRISTOR CONVERTERS FOR SUPPLYING THREE PHASE MOTORS

BACKGROUND OF THE INVENTION

This invention relates to the synchronizing of free-running or load-controlled static thyristor converters in general, and more particularly to an improved synchronizing arrangement, particularly useful in the chemical-fiber industry, which permits one converter to be synchronized with the other and then smoothly take over the load.

In the various industries, such as the chemical fiber industry, there has been an increasing use of static converters having thyristors with each of the converters feeding a number of similar motors connected to a load bus with the motors providing the electric drives for drive cylinders, galettes, spinning pumps, traverses and the like of a processing machine. As a rule, each load bus operates at a specific frequency. In this manner, for example, thirty or more different converters located in a converter room, feed individual groups of drive motors at different frequencies. Each processing machine is then electrically a series connection of different frequency planes.

To provide for situations where a converter fails and to avoid shutting down the whole processing machine under these conditions until the failed converter is repaired, which shut-down can cause a considerable production loss, it is common to provide one or more spare converters to take over the load of the failed converter.

Once the failed converter is repaired, it is then usually desirable to reconnect it to its load. Previously, it is generally been necessary to interrupt production of the processing machine and start anew with the repaired converter, since synchronizing devices with the required frequency range and voltage wave required have not been available.

Various attempts have been made to use synchronizing methods from power engineering technology but with unsatisfactory results. This is due to the fact that in processes such as those in the chemical fiber industry, a shock-free transition from one converter system to the other system is absolutely necessary because of the thread or other material being processed. The basis of previously known methods was essentially to ascertain, adjust and then switch the phase frequency and voltage of the converters to be synchronized in the manner of a light-dark circuit. Despite apparent synchronization, excessive current surges have been repeatedly observed, resulting in the immediate loss of the converter and thus, in the last analysis, the undesirable starting-up of the processing machine with all the disagreeable consequences such as loss of production and a decrease in the quality of the end product during the forced starting phase.

Thus, it is clear that a need exists for synchronizing apparatus, which will permit one converter to take over the load from another converter smoothly and without current surge and in a completely automatic manner. Furthermore, such an arrangement must be operable in a reliable manner, over a wide frequency range and should be economical, requiring small amounts of circuitry.

SUMMARY OF THE INVENTION

The present invention provides such an arrangement for sychronizing converters which permits one converter taking over the load from another, smoothly, without disruption of the process being driven. To accomplish this, apparatus is provided to compare the phase and frequency of the control commands, for the thyristors in the individual converters so that at a predetermined agreement between the control commands of the two converters a take over command is provided. In addition, the voltages are compared to ensure agreement and means provided to automatically shift the phase and frequencies of the converters relative to each other to reach the predetermined point of agreement. This solution to the problem of synchronization is based on the finding that the square-wave output voltage of the converters is distorted by the back emf of the motors, which are usually designed for sinusoidal voltages, in such a manner that the signals derived therefrom are not usable for the synchronizing process and that clean synchronizing data can be derived only from the converter control unit. The use of synchronizing data from the logic portion of the control unit has the further advantage that additional processing of the signals is immediately possible at the same low voltage levels as are found in the logic portion of the converter.

Through the synchronization obtained according to the present invention, stoppage of the processing machine when switching from the spare converter to the repaired original converter is eliminated and the variations in the quality of the product which result from fresh starting-up are also avoided. In addition to these advantages, it is also possible with the synchronizing arrangement of the present invention, to replace any converter with a spare converter without interrupting production, and if necessary to maintain and repair the converter. Clearly, this permits easier, periodic maintenance and control of the electrical apparatus.

In order to economically make the necessary comparisons, the disclosed apparatus uses the digital reference signal indicating the phase of the converters to be synchronized to also monitor frequency equality. Repeated agreement of the phase of the converters is equivalent to agreement in frequency considering the accuracy of the reference signals and thus, means may be provided to sense such conditions. It thus, becomes unnecessary to separately monitor the frequency.

In order to obtain phase coincidence in converters of the type, for example, which operate with digital frequency generators and are preset in a decade-wise manner to the same frequency, in the preferred embodiment, means are provided to automatically vary the frequency of one of the converters by an amount which is very small as compared to the operating frequencies, with the variation being maintained until the phases coincide whereupon it is cancelled. Once the phases coincide, the synchronized converter is switched to the load bus by a take-over command, in a manner such that it overlaps with the first converter so that the load is always maintained under control. Only after the second converter is on the line, is the second converter disconnected from the load bus. During the switching phase, the phase and frequency equality is reliably maintained by the digital frequency generators which are operated with crystal accuracy.

The present invention can be used for converters with a variable intermediate link by means of a line-controlled rectifier or a d-c control element, or for converters with a fixed intermediate link and pulse modulation as a free-running rectifier.

BRIEF DESCRIPTION OF THE DRAWINGS

FIG. 1 is a block diagram illustrating the over-all arrangement with two converters which may be synchronized.

FIG. 2 is a logic diagram illustrating in detail the phase comparator arrangement.

DETAILED DESCRIPTION OF THE PREFERRED EMBODIMENT

Illustrated in FIG. 1 are two static converters designed I and II respectively. These converters can deliver at their outputs a square wave voltage with a frequency adjustable, for example, from 20 to 200 Hz and a voltage of 30 to 360 V. They are fed from a three-phase a-c system designated RST with a voltage of, for example, 50-Hz and 380-V. The output voltage of converter I, is for example, coupled through an inductance 6 and the contact 7 of a contactor 8 to a load bus 9 to which permanently excited synchronous motors 10 are connected to be driven by the voltage output by the converter. These motors will, for example, drive spinning pumps which are not shown. The output of the second converter II can be coupled to the bus 9 through an inductance 17 and the contact 16 of a contactor 15. The converter I is shown in somewhat more detail than converter II. Each of the converters has at its input a rectifier designated 1 and 11 respectively. The output of the rectifier is coupled through respective d-c links 2 and 19 to inverters designated 3 and 12 respectively. In well known fashion, the rectifiers 1 and 11 are controlled by voltage control units 4 and 13 respectively. This is the voltage which will flow in the d-c link and be provided to the respective inverter 3 or 12. The inverters 3 and 12 determine the frequency of the output voltage in well known fashion in response to firing command outputs from control units 5 and 14 respectively. Control units 5 and 14 are driven by digital generators or clocks 51 and 18 respectively. Preferably, the digital generators will have a high accuracy quartz crystal oscillator as a time standard.

As illustrated in detail in connection with the converter I, the inverters 3 and 12 will consist essentially of bridge circuits made up of thyristors with the firing pulses for the thyristors being provided by the control units 5 and 14 in a fixed order so that the desired output voltage with a predetermined frequency is obtained.

For understanding the operation of the invention, it is assumed that the converter I is feeding the load bus 9 and that converter II is to take over the load without interruption or current surge. The same frequency is first set at the digital generator 18 as that set at the digital generator 51. Typically, this is done in well known fashion numerically through the use of decade number switches. The voltages U1 and U2 at the outputs of the converters I and II are compared with each other in a synchronizing arrangement 20 to be described in more detail below, to develop a signal $\Delta$ U2 with the correct sign which is proportional to the deviation between the voltages and is used as a control input to the voltage control unit 13 and which will correct its output to cause the amplitude of the voltage U2 to become equal to that of the voltage U1. Such voltage control is conventional in converters of this nature and will not be described in detail herein. The voltage match herein is not particularly critical and need not be extremely accurate.

For comparing the phases 1 and 2 of the frequencies $f1$ and $f2$ being output by the converters I, and II, the firing pulses delivered to respective defined thyristors in the two converters are used. For example, the thyristors linked with the phase R and the minus terminals in both converters can be used. This is the thyristor designated 31 in the inverter 3. The position in time of the firing pulses of these thyristors is used as the reference signal for the instantaneous phase position of the two converters I and II. If time coincidence of the firing pulse occurs, phase equality exists. If this coincidence occurs over several periods within a predetermined tolerance band, frequency equality exists in addition to phase equality.

Normally the frequencies are defined so accurately by the digital generators 51 and 18 that with equal frequency setting, phase equality will only occur very slowly. Thus, in dependence on the existence of a phase inequality, the frequency $f2$ is automatically varied by a programmed fixed value $\Delta f2$. This value $\Delta f2$ is the smallest value of frequency variation that can be adjusted, e.g. the least significant bit of the input. The time sequence of $\phi_1$ and $\phi_2$ relative to each other is thereby slowly shifted. Once phase coincidence occurs, indicating phase equality, the variation $\Delta f2$ is cancelled so that the two frequencies are then equal. This will be noted by a recurring repetition of phase coincidence.

Thus, if the phase, the frequency and the amplitude of the output voltages of the converters I and II are the same, the converter II is then connected to the load bus 9 through the contact 16 of the contactor 15 and the converter I is disconnected after a short delay by opening the contact 7 of the contactor 8. An analogous sequence of events, i.e., a change of $\Delta$ U1 and a frequency change $\Delta f1$, will take place if the converter I is to be switched over from the converter II. In accordance with the principle of the present invention, the converter to be connected is the one which is always controlled, so that the balancing operation does not affect the load bus having a converter connected thereto.

The above described method for use with converters having digital generators may also be applied to converters with analog generators followed by analog-to-digital conversion, wherein the frequency of the phase of the converter to be connected are also slowly varied if phase inequality is detected, until phase and frequency equality is found.

FIG. 2, illustrates in more detail the synchronizing arrangement 20 of FIG. 1. As shown, the voltages U1 and U2 are applied to a differential amplifier 28 which provides an output proportional to their difference designated $\Delta$ U2, which is provided as shown to the control unit 13, causing it to be readjusted until equality results at the input of amplifier 28 to result in a zero output signal. This output is also connected to a comparator 27 which is set to change its state when the output of amplifier 28 is within a predetermined tolerance from zero. Thus, when voltage equality exists with the output of amplifier 28 near zero, the comparator 27 will change state and provide an enabling output to an AND gate 25.

The pulses for the phase comparison are derived from the firing pulses being provided to identically situated thyristors in the converters I and II. These logic signals developed in the control units 5 and 14 are provided as inputs respectively to pulse shaping networks 22 which may be used for adjusting the tolerance range. These may be for example, one shot multivibrators. The outputs of the two pulse shaping circuits are provided to an AND gate 21 which will have an output only when both inputs are present. Thus, unless phase coincidence occurs within the predetermined limits, no output will be provided from gate 21. When coincidence does occur, an output will be provided from AND gate 21. This output is an input to flipflop 23. Flipflop 23 previously will have been in one state where it provides an output signal designated $\Delta f2$ to the control unit 14 causing the frequency of the converter II to differ by the least significant bit from the frequency of the converter I to cause a slow phase shift to permit phase coincidence to be obtained. When the output from AND gate 21 occurs, the state of flipflop 23 will be changed to remove the increment $\Delta f2$. The output of gate 21 is also provided to a counter 24 and causes it to advance in count each time an output occurs. At a predetermined count of counter 24, which corresponds to suitably repeated phase equality and therefor also corresponds to frequency equality, an output signal is provided by the counter 24. Thus, assuming that voltage equality has been reached and an output is being provided from comparator 27, all signals will be present at the input of AND gate 25. Its output is provided to a flipflop 26 causing the flipflop to trigger and change states. As illustrated, the two flipflop outputs are connected respectively to the contactors 8 and 15. In its previous state, as assumed above, the flipflop 26 was energizing contactor 8 to close switch 7. Now, with the trigger command, the flipflop changes state to energize the contactor 15 and deenergize the contactor 8 with a short delay.

Thus, an improved arrangement for synchronizing two static converters to permit one taking over a load from the other has been shown. Although specific embodiments have been illustrated and described, it will be obvious to those skilled in the art that various modifications may be made without departing from the spirit of the invention, which is intended to be limited solely by the appended claims.

What is claimed is:

1. Apparatus for synchronizing a pair of free-running, load controlled, static thyristor converters including control means for generating firing signals at a predetermined frequency for controlling the output voltage frequency of said converters, and in which the phase, frequency and voltage outputs of said converters are compared and adjusted until said phase, frequency and voltage are equal, said apparatus generating a command signal for shifting the load from one of said converters to the other, said apparatus comprising:

first means, coupled to said converters, for comparing the time of firing of two corresponding firing signals in said pair of converters and generating a first output signal upon the simultaneous occurrence of said two firing signals;

second means, coupled to said converters, for comparing the converter output voltages and generating a second output signal when said output voltages are equal;

third means, coupled to said first means, for automatically shifting the phase of one of said converters with respect to the other in the absence of the generation of said first output signal; and fourth means, coupled to said first and second means, and responsive to said first and second output signals, for generating said command signal in response to the generation of both said first and second output signals and thereby shifting the load from one of said converters to the other.

2. The apparatus recited in claim 1, wherein said first means includes means for determining frequency coincidence by detecting repeated phase coincidence.

3. The apparatus recited in claim 2, further comprising digital generators set to the same frequency coupled to said converters for operating said converters and wherein said third means comprises means, responsive to the absence of said first output signal, for changing said set frequency of said digital generators, and for canceling said frequency change in response to the generation of said first output signal.

4. The apparatus recited in claim 3, wherein said fourth means includes means for providing an overlap during shifting of said load from one of said converters to the other.

5. The apparatus recited in claim 1, wherein said control means includes analog frequency generators set to the same frequency coupled to said converters for operating said converters, and analog-to-digital conversion means coupled to said analog frequency generators.

6. A method for synchronizing and shifting a load from one of a pair of free-running, load-controlled static thyristor converters in which thyristor firing signals are generated at a predetermined frequency for controlling the output voltage frequency of said converters and in which the phase, frequency and voltage outputs of said converters are compared and adjusted until said phase, frequency and voltage are equal, comprising the steps of:

comparing the voltages of said pair of converters;

comparing the phase of said pair of converters by comparing the occurrence in time of two corresponding ones of said thyristor firing signals;

comparing the frequency of said firing signals for said pair of converters by detecting repeated phase coincidence;

adjusting the voltage of one of said converters so that it is substantially the same as that of the other;

adjusting the frequency of one of said pair of converters until the phase of said converters are equal; and shifting said load from one of said pair of converters to the other when said phase, frequency and voltage outputs of said converters are equal.

7. The method recited in claim 6, wherein said step of comparing the frequency of said firing signals comprises the step of successively comparing the phase of said converters.

* * * * *